(12) United States Patent
Holmes (10) Patent No.: US 7,575,529 B2
(45) Date of Patent: Aug. 18, 2009

(54) HYBRID ELECTRICALLY VARIABLE TRANSMISSION WITH GEARED REVERSE MODE USING SINGLE MOTOR/GENERATOR

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 378 days.

(21) Appl. No.: 11/531,419

(22) Filed: Sep. 13, 2006

(65) Prior Publication Data
US 2008/0064550 A1    Mar. 13, 2008

(51) Int. Cl.
*F16H 37/04* (2006.01)
*F16H 3/72* (2006.01)

(52) U.S. Cl. ............. 475/5; 475/10; 475/207; 903/917

(58) Field of Classification Search ......... 475/5, 475/10, 151, 201, 207; 903/910, 911, 917, 903/919, 923
See application file for complete search history.

(56) References Cited
U.S. PATENT DOCUMENTS

| | | | |
|---|---|---|---|
| 5,011,463 A * | 4/1991 | Jarchow et al. | 475/74 |
| 6,645,105 B2 * | 11/2003 | Kima | 475/5 |
| 6,716,126 B2 * | 4/2004 | Bowen | 475/5 |

* cited by examiner

Primary Examiner—Sherry L Estremsky
Assistant Examiner—Erin D Bishop (57) ABSTRACT

An electrically variable transmission having a single motor/generator provides electrically variable power flow along dual power paths and provides an electrically variable reverse operating mode. The transmission includes a compound differential gear set having at least four gear elements operatively interconnected with one another. A transmission input member and the single motor/generator selectively provide power to a transmission output member via the differential gear set. The transmission includes a plurality of intermeshing gears, including a reversing gear and gears connected for rotation with the output member, for operatively connecting the differential gear set with the output member. Torque-transmitting mechanisms are selectively engagable to provide power flow between the input member and the output member in multiple operating modes, including a parallel hybrid electrically variable reverse operating mode utilizing the reversing gear. A method of operating a transmission that allows shifting between different gearing portions of the transmission is provided.

19 Claims, 4 Drawing Sheets

FIG. 1

| OPERATION and CLUTCHING | CA | CB | CR | C1 | C2 | C3 | C4 | C5 | C6 |
|---|---|---|---|---|---|---|---|---|---|
| Key-on engine starting and idle | ON | ON | | | | | | | |
| EVT reverse range boosting/braking | | ON | ON | | | | | | |
| Fixed reverse gear | ON | ON | ON | | | | | | |
| Engine-off reverse driving | | ON | ON | ON | | | | | |
| Engine-on forward driving | ON | | ON | ON | | | | | |
| EVT range 1 boosting/braking | ON | | | ON | | | | | |
| Fixed gear 1-1 | ON | ON | | ON | | | | | |
| EVT range 1 charging | ON | ON | | ON | | | | | |
| Fixed gear 1-2 | | | | ON | ON | | | | |
| EVT range 2 boosting/braking | | ON | | | ON | | | | |
| Fixed gear 2-2 | ON | ON | | | ON | | | | |
| EVT range 2 charging | ON | | | | ON | | | | |
| Fixed gear 2-3 | ON | | | | ON | ON | | | |
| EVT range 3 boosting/braking | ON | ON | | | | ON | | | |
| Fixed gear 3-3 | ON | | | | | ON | | | |
| EVT range 3 charging | ON | ON | | | | ON | | | |
| Fixed gear 3-4 | ON | ON | | | | ON | ON | | |
| EVT range 4 boosting/braking | ON | ON | | | | | ON | | |
| Fixed gear 4-4 | ON | | | | | | ON | | |
| EVT range 4 charging | ON | | | | | | ON | | |
| Fixed gear 4-5 | ON | | | | | | ON | ON | |
| EVT range 5 boosting/braking | ON | ON | | | | | | ON | |
| Fixed gear 5-5 | ON | ON | | | | | | ON | |
| EVT range 5 charging | ON | ON | | | | | | ON | |
| Fixed gear 5-6 | ON | | | | | | | ON | ON |
| EVT range 6 boosting/braking | ON | ON | | | | | | | ON |
| Fixed gear 6-6 | ON | ON | | | | | | | ON |
| EVT range 6 charging | ON | ON | | | | | | | ON |

HYBRID ELECTRICALLY VARIABLE TRANSMISSION WITH GEARED REVERSE MODE USING SINGLE MOTOR/GENERATOR

TECHNICAL FIELD

The invention relates to a hybrid electrically variable transmission having a single motor/generator, and a reversing gear, and operable in a hybrid electrically variable mode.

BACKGROUND OF THE INVENTION

Hybrid electrically variable powertrains include an engine and a transmission which receives power flow from the engine and from one or more motor/generators. Hybrid electrically variable transmissions have a differential gear set, with power from the engine and power to and from a motor/generator flowing through different members of the differential gear set. Hybrid electrically variable transmissions may include torque-transmitting mechanisms controllable in various engagement schemes to offer a combination of operating modes, including both electrically variable ranges and fixed gear ratios. The electrically variable ranges typically provide optimum engine speed with smooth operation while the fixed gear ratios provide maximum torque performance and maximum fuel economy under certain conditions such as continuous highway cruising. The electrically variable range is established via an electromechanical power path, wherein a fraction of the power transmitted from the engine to the output is converted into electricity by a motor/generator then back into mechanical power by a motor/generator. Fixed gear ratios typically provide excellent transmission output torque and vehicle acceleration by coupling the motor/generators and the engine directly together. In a fixed gear ratio, the power flow path from the transmission input member to the transmission output member is considered to be entirely through a mechanical power path, as speed is not varied by the motor/generator.

SUMMARY OF THE INVENTION

An electrically variable transmission having a motor/generator provides power-split, electrically variable power flow along dual power paths and provides an electrically variable reverse operating mode. Thus, the operating comfort of a continuously variable transmission and the low cost and compact nature of an EVT are both attainable using only a single motor/generator for propulsion. The transmission includes a compound differential gear set having at least four gear elements operatively interconnected with one another. A transmission input member and the motor/generator selectively provide power to a transmission output member via a first and a second of said gear elements. The transmission includes a plurality of intermeshing gears, including a reversing gear, for operatively connecting a third and fourth of the gear elements with the output member via first and second transfer shafts, respectively. Preferably at least one of the third and fourth gear elements can be operatively connected to the output member with at least two different speed ratios between that element and the output member. Torque-transmitting mechanisms are selectively engagable to provide power flow between the input member and the output member in multiple operating modes, including a parallel hybrid electrically variable reverse operating mode utilizing the reversing gear.

As used herein, a "gear element" is an element of a differential gear set that can be represented by a node on a lever diagram. For instance, in a planetary gear set, a carrier member, a sun gear member and a ring gear member are all represented as nodes on a lever diagram, but pinion gears supported by the carrier member are not represented as nodes. Also, in a compound planetary gear set, those gear elements that are continuously interconnected with one another are represented by a single node. Those skilled in the art readily understand the representation of compound differential gear sets as lever diagrams.

As used herein, a "mode" is a particular operating state, whether encompassing a continuous range of speed ratios or only a fixed speed ratio, achieved by engagement of a particular torque-transmitting mechanism or combination of torque-transmitting mechanisms.

The torque-transmitting mechanisms may include a lock-up clutch that connects two of the gear elements of the differential gear set for common rotation, thereby causing the entire differential gear set, to rotate at the same speed, to provide direct power flow from the input member to the output member.

The torque-transmitting mechanisms may include first and second motor clutches that selectively connect the motor/generator to different respective gear elements. The motor clutches permit, among other things, disengagement of the motor/generator during shifting between operating modes to disconnect the motor inertia, thus allowing easier shifting, including the possibility of manual shifting.

In one aspect of invention, a brake is selectively engagable to partially ground (i.e., retard) one of the gear elements of the differential gear set. This may be desirable to provide an alternate speed ratio (determined by the slip speed of the brake) through the differential gear set, with the retarded gear element providing reaction torque.

In another aspect of the invention, a clutch provided to selectively engage a gear to one of the transfer shafts is disengaged following engagement of a clutch provided to selectively engage another gear to a different transfer shaft, thus allowing a synchronous shift between electrically variable operating modes. The brake used to retard the sun gear member alters the speed of the transfer shaft to which the clutch is to be engaged until the speed of the shaft is such that a smooth shift is possible. Because the ratio provided by the differential gear set is varied by the slipping brake, the otherwise fixed ratio steps from one speed ratio to the next are not determinative of when the shift may occur. Thus, the invention also provides a method of operating a transmission by slipping the brake, as described above.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

First Embodiment

Figure 1:
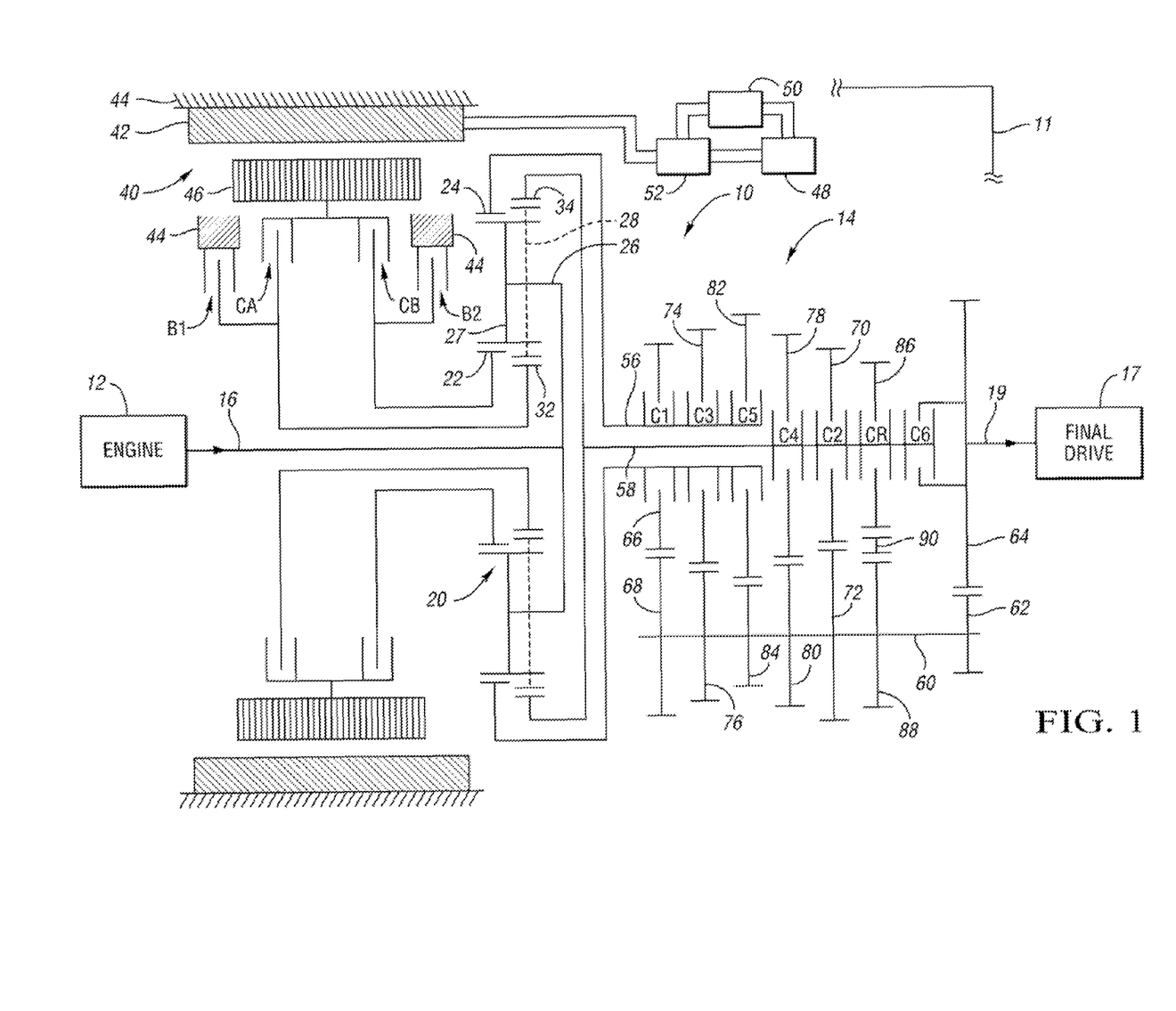
FIG. 1 is a schematic illustration of a first powertrain including a first transmission within the scope of the invention.

Referring to the drawings, wherein like reference numbers refer to like components, FIG. 1 shows a powertrain 10 for a vehicle 11 (shown schematically). The powertrain 10 includes an engine 12 connected to one embodiment of a electrically variable transmission (EVT) designated generally by the numeral 14. The transmission 14 is designed to receive at least a portion of its driving power from the engine 12. The engine 12 has an output shaft connected with an input member 16 of the transmission 14. A final drive unit 17 is operatively connected to an output member 19 of the transmission 14.

The transmission 14 includes a compound differential gear set 20. The differential gear set 20 is a Ravigneaux type gear set, although other types of differential gear sets may be used within the scope of the invention. Specifically, the differential gear set 20 includes a sun gear member 22, a ring gear member 24 and a carrier member 26 that rotatably supports a first set of pinion gears 27 that intermesh with the sun gear member 22 and the ring gear member 24 and with a second set of pinion gears 28. The carrier member 26 also rotatably supports the second set of pinion gears 28 that intermesh with a sun gear member 32 and a ring gear member 34 and with the first set of pinion gears 27. Those skilled in the art will recognize that the differential gear set 20 may be represented as a five node lever diagram, each node of the lever diagram representing the following gear elements: sun gear member 22, sun gear member 32, carrier member 26, ring gear member 24 and ring gear member 34.

The input member 16 is continuously connected with the carrier member 26. A single motor/generator 40 is selectively connectable to the sun gear member 22 and to the sun gear member 32. The ring gear members 24 and 34 function as two separate output elements of the differential gear set, partially forming two separate power paths through the transmission 14, as discussed below.

The motor generator 40 includes a stator portion 42 grounded to a stationary member 44, such as the transmission housing. A rotor portion 46 of the motor/generator 40 is selectively connectable to the sun gear members 22, 32 via motor clutches CA, CB, respectively. The stator 42 may receive electrical power from or provide electrical power to an energy storage device 48 such as a battery. An electronic controller 50 is in signal communication with the battery 48 and with a power inverter 52 that is also in electrical communication with the stator 46. The controller 50 responds to a variety of input signals including vehicle speed, operator demand, the level at which the battery 48 is charged and the power being provided by the engine 12 to regulate the flow of power between the motor/generator 40 and the battery 48 via the inverter 52, which converts between direct current provided or utilized by the battery 48 and alternating current provided or utilized by the stator.

The transmission 14 further includes transfer shafts 56, 58, countershaft 60 and a plurality of intermeshing gears selectively connecting the transfer shafts 56, 58 with countershaft 60 as described below. Ring gear member 24 is continuously connected with transfer shaft 56. Ring gear member 34 is continuously connected with transfer shaft 58. Countershaft 60 is continuously connected with the output member 19 via an output gear set gear that includes gear 62 rotating commonly with countershaft 60 and gear 64 intermeshing with gear 62 and rotating commonly with output member 19. A plurality of intermeshing gears selectively transfer torque from the transfer shafts 56, 58 to the countershaft 60. A first intermeshing gear set includes intermeshing gears 66 and 68. Gear 66 rotates concentrically about transfer shaft 56 and is selectively connectable for common rotation therewith by selective engagement of clutch C1. Gear 68 rotates with countershaft 60. A second intermeshing gear set includes intermeshing gears 70 and 72. Gear 70 rotates concentrically about transfer shaft 58 and is selectively connectable for common rotation therewith by selective engagement of clutch C2. Gear 72 rotates with countershaft 60. A third intermeshing gear set includes intermeshing gears 74 and 76. Gear 74 rotates concentrically about transfer shaft 56 and is selectively connectable for common rotation therewith by selective engagement of clutch C3. Gear 76 rotates with countershaft 60. A fourth intermeshing gear set includes intermeshing gears 78 and 80. Gear 78 rotates concentrically about transfer shaft S8 and is selectively connectable for common rotation therewith by selective engagement of clutch C4. Gear 80 rotates with countershaft 60. A fifth intermeshing gear set includes intermeshing gears 82 and 84. Gear 82 rotates concentrically about transfer shaft S6 and is selectively connectable for common rotation therewith by selective engagement of clutch C5. Gear 84 rotates with countershaft 60. A reversing gear set includes intermeshing gears 86, 88 and 90. Gear 86 rotates concentrically about transfer shaft S8 and is selectively connectable for common rotation therewith by selective engagement of clutch CR. Gear 88 rotates with countershaft 60. Reversing gear 90 intermeshes with both gears 86 and 88 so that gears 86 and 88 rotate in the same direction. The reversing gear 90 is supported on a separate shaft or support structure (not shown) and rotates about an axis parallel to the transfer shafts 56, 58 and the countershaft 60. Clutch C6 is selectively engagable to directly connect gear 64 and output member 19 for common rotation with transfer shaft 58.

In addition to the nine clutches CA, CB, C1, C2, C3, C4, C5, C6 and CR, the transmission 14 includes brakes B1 and B2 selectively grounding or partially grounding (i.e., retarding) sun gear member 32, 22, respectively to the stationary member 44. Accordingly, the transmission 14 has eleven torque-transmitting mechanisms. The torque-transmitting mechanisms are operatively connected to controller 50 which controls engagement thereof to provide the operating modes set forth in the engagement schedule of FIG. 2. Clutches CA and CB are preferably spring-applied plate clutches. Clutches C1, C2, C3, C4, C5 and C6 are preferably dog clutches which are bi-stable, that is, including a spring mechanism to hold each clutch in either its "on" position or "off" position without further action from the operator or control system, as will be understood by those skilled in the design of manual transmissions.

Figure 2:
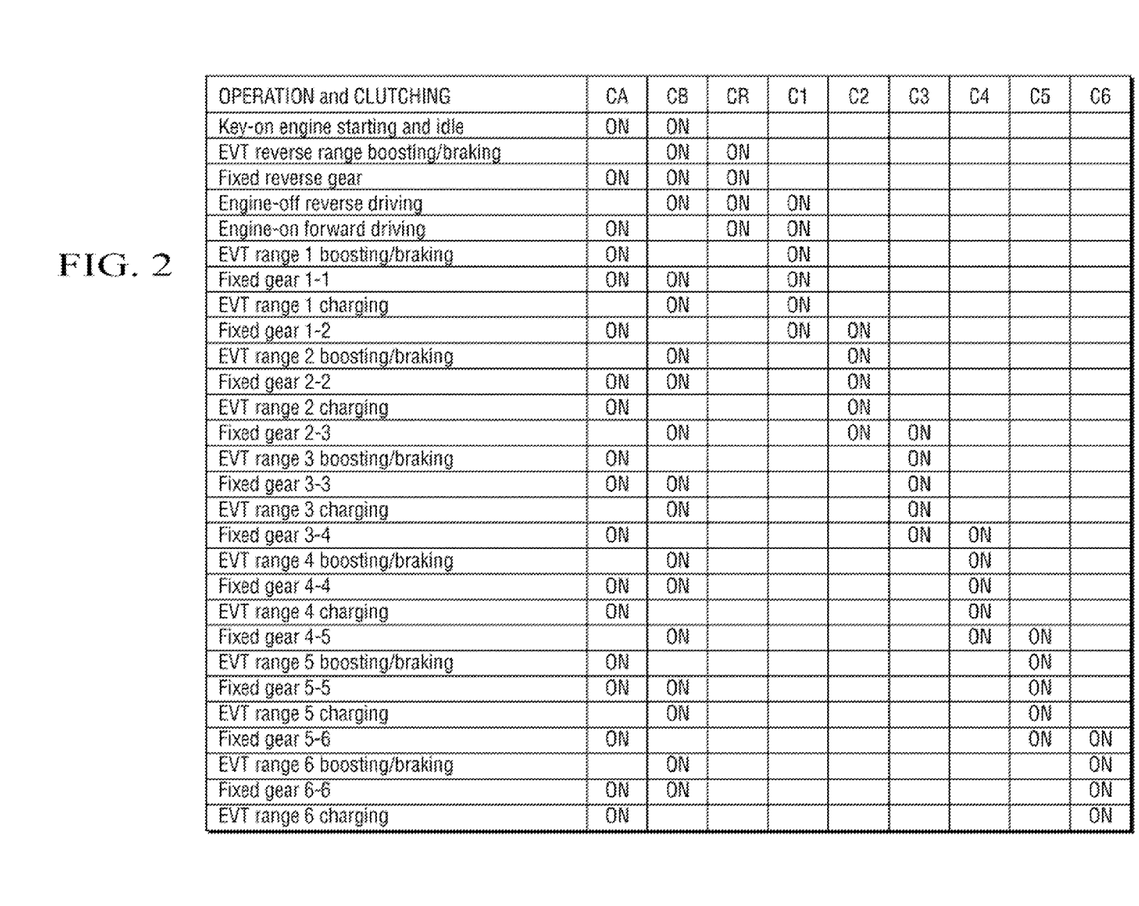
FIG. 2 is a table indicating the engagement schedule of the torque-transmitting mechanisms of the transmission of FIG. 1 to achieve various operational modes of the transmission.

As set forth in FIG. 2, the powertrain 10 provides several electric-only operating modes wherein power is provided only by the motor/generator 40, such as key-on engine starting, engine-off reverse driving, and engine-off forward driving. Many electrically variable operating modes are provided including: EVT reverse range driven by the engine 12 with electric boosting/braking from the battery 48 and motor/generator 40, EVT ranges 1-6 with charging of the battery using the motor/generator and EVT ranges 1-6 with electric boosting/braking. In those EVT ranges referred to as "boosting/braking", the motor/generator 40 is acting as a motor to add torque to the transmission 14 during boosting. If braking occurs during these modes, the motor/generator is controlled as a generator to convert rotational speed of one of the sun gear members (i.e., mechanical power of sun gear member 22 or 32 depending on which of the clutches CA or CB is engaged), into stored electrical power in the battery 48 with the motor rotor 46 absorbing torque as it does so to help slow the output member 19 and brake the vehicle 11. Similarly, in those EVT ranges referred to as "charging", the motor/generator 40 is controlled to operate as a generator to recharge the battery 48. However, as those skilled in the art of power-split transmissions will recognize, charging may also take place in those ranges referred to as "boosting/braking", particularly if the speed ratio through the transmission is high enough to reverse the direction of the motor/generator from the normal direction in that mode, which will occur when launching the vehicle from rest with the engine driving the vehicle. A fixed reverse gear ratio as well as eleven separate fixed forward speed ratios are achieved according to the engagement chart of FIG. 2. As those skilled in the art of fixed-ratio transmissions will recognize, other fixed forward ratios are possible by the combined action of both one clutch operatively connected to one transfer shaft 56 and one clutch connected to the other transfer shaft 58, ratios which are not in the sequence shown in FIG. 2. Furthermore, still more forward and reverse fixed ratios are possible by the combined action of both one clutch operatively connected to one transfer shaft (56 or 58) and one brake (CA or CB).

The operating mode referred to as "key-on engine starting and idle" is achieved by engaging both of the motor clutches CA and CB. Electrical energy is supplied from the battery 48 to the motor/generator 40, which acts as a motor to turn both of the sun gear members 22, 32 in the same direction. The transfer shafts rotate relatively freely, as none of the other torque-transmitting mechanisms are engaged, so the output member 19 does not rotate. The pinions gears 27, 28 rotate due to the sun gear members 22, 32, and cause the carrier member 26, and thus the input member 16, to rotate. This in turn causes rotation of the engine output member (connected to the transmission input member 16), turning the engine over to start the engine 12

The three reverse operating modes indicated in FIG. 2 require engagement of the reverse clutch CR. First, an EVT reverse range is achieved by engaging both CB and CR. Torque is supplied to the carrier member 26 via the engine 12 and to the sun gear member 22 via the motor/generator 40. The carrier member transfers torque to the ring gear member 34 which supplies mechanical power along transfer shaft 58 through the reversing gear set, gear 86, reversing gear 90 and gear 88, to countershaft 60 through the output gear set (gears 62 and 64) to the output member 19. The input member 16, carrier member 26, ring gear member 34 and gear 86 all rotate in the same direction, with the reversing gear reversing the direction, and gears 88 and 62 therefore rotating in the same direction as the input member 16. Gear 64 and the output member 19 thus rotate in the opposite direction than the engineer 12, providing a reverse operating mode. The brake B1 may be applied to retard sun gear member 32, thus providing a reaction torque which allows torque to be transmitted from the input member 16 to the output member 19 and may supplement or replace torque from the motor/generator on the sun gear member 22. Alternatively, the controller 20 may control the brake B1 so that it slips, thus allowing synchronous shifting of clutches on the transfer shafts 56, 58, as discussed below.

A fixed reverse gear mode is achieved by engaging CA, CB and CR. In this arrangement, all members of the planetary gear set 20 as well as the input member 16 and the motor/generator 40 rotate at the same speed. Torque is transferred to the output member 19 via the reverse gear set (gear 86, reversing gear 90 and gear 88), countershaft 60, and the output gear set (gear 62 and gear 64).

An electric-only reverse mode is achieved by engaging clutch CB as well as clutches C1 and CR. The motor/generator 40 supplies mechanical power to the sun gear member 22. Pinion gears 27, 28, respectively, supply mechanical power to the ring gear members 24 and 34. Ring gear member 24 and the first intermeshing gear set (gear 66 and gear 68) are sized to provide the same rotational speed to the countershaft 60 as ring gear member 34 and the reverse gear set (gear 86, reversing gear 90 and gear 88). The reversing gear 90 reverses the direction of rotation so that gear 88 rotates at the same speed and in the same direction as gear 68. This causes the input member 16 and engine 12 to stand still while the motor/generator 40 can be controlled to drive the output member 19 in either direction. Thus, first and second power paths (ring gear member 24 and transfer shaft 56 being the first power path, ring gear member 34 and transfer shaft 58 being the second power path) utilize a first gear ratio through the first gear set (gear 66 and gear 68) and a reverse gear ratio through the reversing gear set (gear 86, reversing gear 90 and gear 88) produce a zero engine speed, without requiring a brake on the engine output shaft, thus allowing the motor/generator 40 to independently control the speed of the output member 19 and drive the vehicle 11 in either direction. The first power path, which includes ring gear member 24 and transfer shaft 56, is used when any of clutches C1, C3 and C5 are engaged. The second power path, which includes ring gear member 34 and transfer shaft 58, is used when any of clutches C2, C4, C6 and CR are engaged.

Several electrically variable operating modes are achieved as the engine 12 and the motor/generator 40 are connected to the transfer shafts 56, 58 through the differential gear set 20. The EVT modes utilize split power flow through the differential gear set 20, with both the engine 12 providing power to the differential gear set 20 and the motor/generator 40 providing power to or receiving power form the differential gear set 20. A reverse gear set (86, 90, 88) achieves a parallel hybrid electrically variable reverse operating mode which allows the engineer 12 to drive the vehicle in reverse using a single motor/generator 40 without requiring additional power from the battery 48. The presence of a hybrid electrically variable reverse operating mode incorporating a reverse gear and allows the selection of either sending power to the battery or taking power from the battery while using the engine to drive the vehicle in reverse, so that the vehicle may be operated in reverse using the single motor/generator to control transmission speed ratio and provide torque with the battery full or empty.

The transmission 14 may be shifted between electrically variable operating modes with synchronous shifting of the torque-transmitting mechanisms that are selectively engagable with the transfer shafts 56 and 58. For instance, a shift from the operating mode "EVT range 1 charging" to "EVT range 2 boosting/braking" may be accomplished by disengaging C1 while engaging C2 with each of the two clutches having zero relative speed across its engaging elements. That is, while using one of the gear members 24 of the differential gear set 20 to provide power to the output 19 through one transfer shaft 56 via an engaged clutch C1, the speed ratio of the transmission can be adjusted so that the speed of the other transfer shaft 58 is changed to provide zero relative speed across a disengaged clutch C2 connected to that transfer shaft 58, which would commonly be described as "synchronizing" the clutch C2 for shifting. It should be appreciated that B2 may be partially engaged (i.e., slipped, also referred to as "dynamically braked") during either of these EVT operational modes to slow sun gear member 22, thus affecting the speeds of the input 16, ring gear member 34 and transfer shaft 58, but not affecting the speed of ring gear member 24 and transfer shaft 56. The sun gear elements 22 and 32 can be used to control the speed ratio through the differential gear set 20, by action of the motor/generator 40, brakes B1 and B2, or both, to allow the speed of the engine 12 to be adjusted for efficiency and power. When transfer shaft 58 is slowed to an appropriate speed, clutch C2 may be engaged and C1 may then be disengaged without causing an undesirable change in the speed of the output member 19, because the shift is fully synchronous, the shift does not itself change the speed ratio of the transmission, and instead the shift prepares the transmission for ratio changes through a certain range while maintaining favorable operation of the motor/generator.

Thus, referring to the transmission of FIG. 1, a method of operating the transmission 14 includes slipping the brake B2 to alter a speed of rotation of the sun gear member 22, thereby altering the speed of rotation of transfer shaft 58. During slipping of the brake B2, when the transfer shaft 58 has been slowed to an appropriate speed, the method includes engaging a torque-transmitting mechanism, such as clutch C2, to connect a gear (gear 70) for common rotation with the transfer shaft 58, to thereby transfer torque via the first power path (ring gear member 34 and transfer shaft 58) through the intermeshing gears 70, 72 to countershaft 60 and ultimately to output member 19. Immediately following the engagement of clutch C2, and during slipping of the brake B2, the method then includes disengaging a torque-transmitting mechanism, such as C1, to disconnect a gear (gear 74) from common rotation with transfer shaft 56 to thereby stop the transfer of torque via the second power path (ring gear member 24 and transfer shaft 56). It should be appreciated that B1 may be slipped instead of B2 in the case of providing braking torque on the output member 19, and the method applies whether or not motor torque is also used to slow the speed of one of the sun gear members 22, 32.

Several "fixed gear" ratio operating modes are achieved, either by engaging both of the motor clutches CA and CB and one of the clutches engaged on the transfer shafts 56, 58, or by engaging one of the motor clutches CA and CB and two of the clutches arranged on the transfer shafts 56, 58. These engagement combinations using three clutches effectively lock the differential gear set 20 into definite sets of speed ratios among all of its elements, thus providing fixed speed ratios between the input member 16 and output member 19.

Second Embodiment

Figure 3:
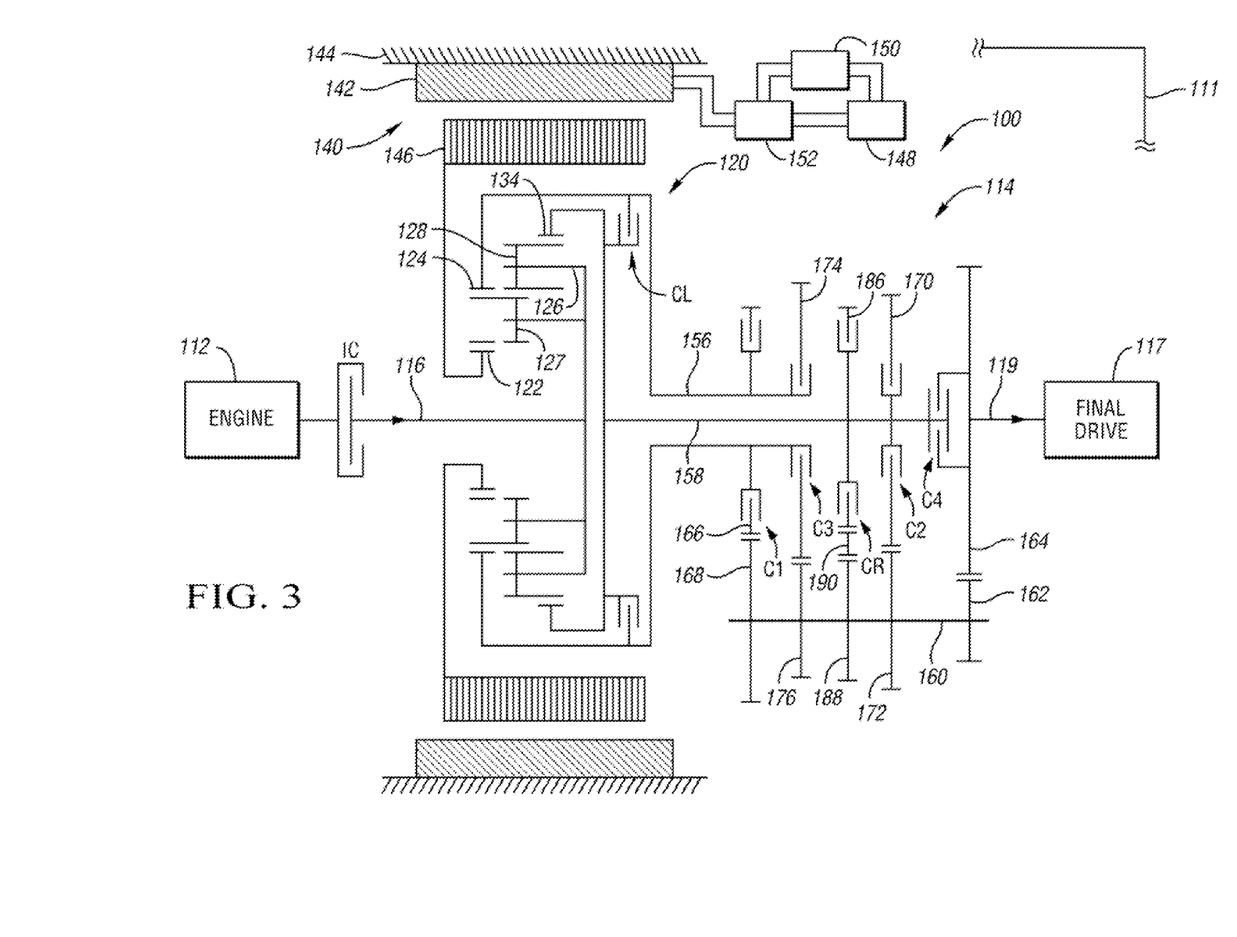
FIG. 3 is a schematic illustration of a second powertrain including a second transmission within the scope of the invention.

FIG. 3 shows a powertrain 100 for a vehicle 111 (shown schematically). The powertrain 100 includes an engine 112 connected to one embodiment of an electrically variable transmission (EVT) designated generally by the numeral 114. The transmission 114 is designed to receive at least a portion of its driving power from the engine 112. The engine 112 has an output shaft connected with an input member 116 of the transmission 114. A final drive unit 117 is operatively connected to an output member 119 of the transmission 114.

The transmission 114 includes a compound differential gear set 120. The differential gear set 120 has four gear elements and can be represented by a four node lever diagram with the sun gear member 122, carrier member 126, and ring gear members 124 and 134 corresponding with the four nodes. The carrier member 126 rotatably supports a first set of pinion gears 127 that intermesh with the sun gear member 122 and the ring gear member 124 and with a second set of pinion gears 128. The carrier member 126 also rotatably supports a second set of pinion gears 128 that intermesh with the pinion gears 127 and the ring gear member 134 and with the first set of pinion gears 127.

The input member 116 is continuously connected with the carrier member 126. A single motor/generator 140 is continuously to the sun gear member 122. The ring gear members 124 and 134 are two separate output elements of the differential gear set 120 partially forming two separate power paths through the transmission 114, as discussed below.

The motor generator 140 includes a stator portion 142 grounded to a stationary member 144, such as the transmission housing. A rotor portion 146 of the motor/generator 140 is continuously connected to the sun gear member 122.

The stator 142 may receive electrical power from or provide electrical power to an energy storage device 148 such as a battery. An electronic controller 150 is in signal communication with the battery 148 and with a power inverter 152 that is also in electrical communication with the stator 142. The controller 150 regulates the flow of power between the motor/generator 140 and the battery 148 via the inverter 152 in the same manner as described above with respect to controller 50 of FIG. 1.

Ring gear member 124 is continuously connected with transfer shaft 156. Ring gear member 134 is continuously connected with transfer shaft 158. A countershaft 160 is continuously connected with the output member 119 via an output gear set gear that includes gear 162 rotating commonly with countershaft 160 and gear 164 intermeshing with gear 162 and rotating commonly with output member 119. A plurality of intermeshing gears selectively transfer torque from the transfer shafts 156, 158 to the countershaft 160. A first intermeshing gear set includes intermeshing gears 166 and 168. Gear 166 rotates concentrically about transfer shaft 156 and is selectively connectable for common rotation therewith by selective engagement of clutch C1. Gear 168 rotates with countershaft 160. A second intermeshing gear set includes intermeshing gears 170 and 172. Gear 170 rotates concentrically about transfer shaft 158 and is selectively connectable for common rotation therewith by selective engagement of clutch C2. Gear 172 rotates with countershaft 160. A third intermeshing gear set includes intermeshing gears 174 and 176. Gear 174 rotates concentrically about transfer shaft 156 and is selectively connectable for common rotation therewith by selective engagement of clutch C3. Gear 176 rotates with countershaft 160. A reverse gear set includes intermeshing gears 186, 188 and 190. Gear 186 rotates concentrically about transfer shaft 158 and is selectively connectable for common rotation therewith by selective engagement of clutch CR. Gear 188 rotates with countershaft 160. Reversing gear 190 intermeshes with both gears 186 and 188 so that gears 186 and 188 rotate in the same direction. The reversing gear 190 is supported on a separate shaft or support structure (not shown) rotating about an axis parallel to the transfer shafts 156, 158 and countershaft 160. Clutch C4 is selectively engagable to directly connect gear 164 and output member 119 for common rotation with countershaft 158.

In addition to the clutches C1, C2, C3, C4 and CR, the transmission 114 includes a lockup clutch CL that selectively connects the ring gear members 124 and 134 for common rotation, thus causing the entire planetary gear set 120 to rotate at a common speed. The engine 112 and the motor/generator 140 also rotate at the same speed in a direct parallel hybrid operating mode, assuming power is supplied from both the engine 112 and the motor/generator 140. Finally, an input clutch IC is selectively engagable to connect the engine 112 to the input member 116, so that the motor/generator 140 may be operatively connected to the output 119 without the engine. Accordingly, the transmission 114 has seven torque-transmitting mechanisms. The torque-transmitting mechanisms are operatively connected to controller 150 which controls engagement thereof to provide a variety of operating modes.

The powertrain 100 provides several electric-only operating modes wherein power is provided only by the motor/generator 140, such as key-on engine starting, engine-off reverse driving, and engine-off forward driving. Many electrically variable operating modes are provided, in which the engineer 112 provides power and the motor/generator 140 provides power to or receives power from the differential gear set 120, including EVT reverse ranges, EVT forward ranges wherein the motor/generator is acting as a generator to charge the battery 148 or is acting as a motor to add mechanical power to the sun gear member 122. If braking occurs during these modes, the motor/generator 140 may be controlled to convert rotational speed of sun gear member 122 into stored electrical power in the battery 148, with the motor rotor 146 absorbing torque as it does so to help slow output member 119 and brake the vehicle 111. Similarly, in some EVT ranges, the motor/generator 140 is controlled to operate as a generator to recharge the battery 148. EVT forward ranges are achieved by engaging clutch IC and any one of clutches C1, C2, C3 and C4. An EVT reverse range is achieved by engaging clutch IC and clutch CR. Fixed ratios are achieved by engaging clutch IC, clutch CL and any one of clutches C1, C2, C3, C4 and CR. Alternatively, CL may be disengaged and electrical power to the stator 142 may be shut off to achieve a fixed ratio through the differential gear set 120, with IC and any two of the clutches C1, C2, C3, and C4 engaged to obtain other specific fixed ratios between the input member 116 and the output member 119.

An electrically variable reverse operating mode is achieved by engaging the clutch IC and the clutch CR. When the motor/generator 140 is operated as either a motor or as a generator and the engineer 112 is on, torque will be delivered from the ring gear member 134 along transfer shaft 158 through reverse gear set (gear 186, gear 190 and gear 188), to countershaft 160 and then through gears 162 and 164 to output member 119. Because of the reversing gear 190, the transfer shaft 158 and countershaft 160 rotate in the forward direction so that output member 119 rotates in the reverse direction.

An electric-only operating mode is provided in which the motor/generator 140 sends power through the differential gear set 120 to the transfer shaft 156 and through gears 166 and 168 via engaged clutch C1 through gears 162 and 164 to output member 119. In this mode, the differential gearset 120 is secured for common rotation by clutch CL. By engaging the input clutch IC, the engine 112 may be started if, for example, additional torque is required for acceleration.

A first power path including ring gear member 124 and transfer shaft 156 is used when any of clutches C1 and C3 are engaged. A second power path including ring gear member 134 and transfer shaft 158 is used whenever any of clutches C2, C4 and CR and engaged.

Third Embodiment

Figure 4:
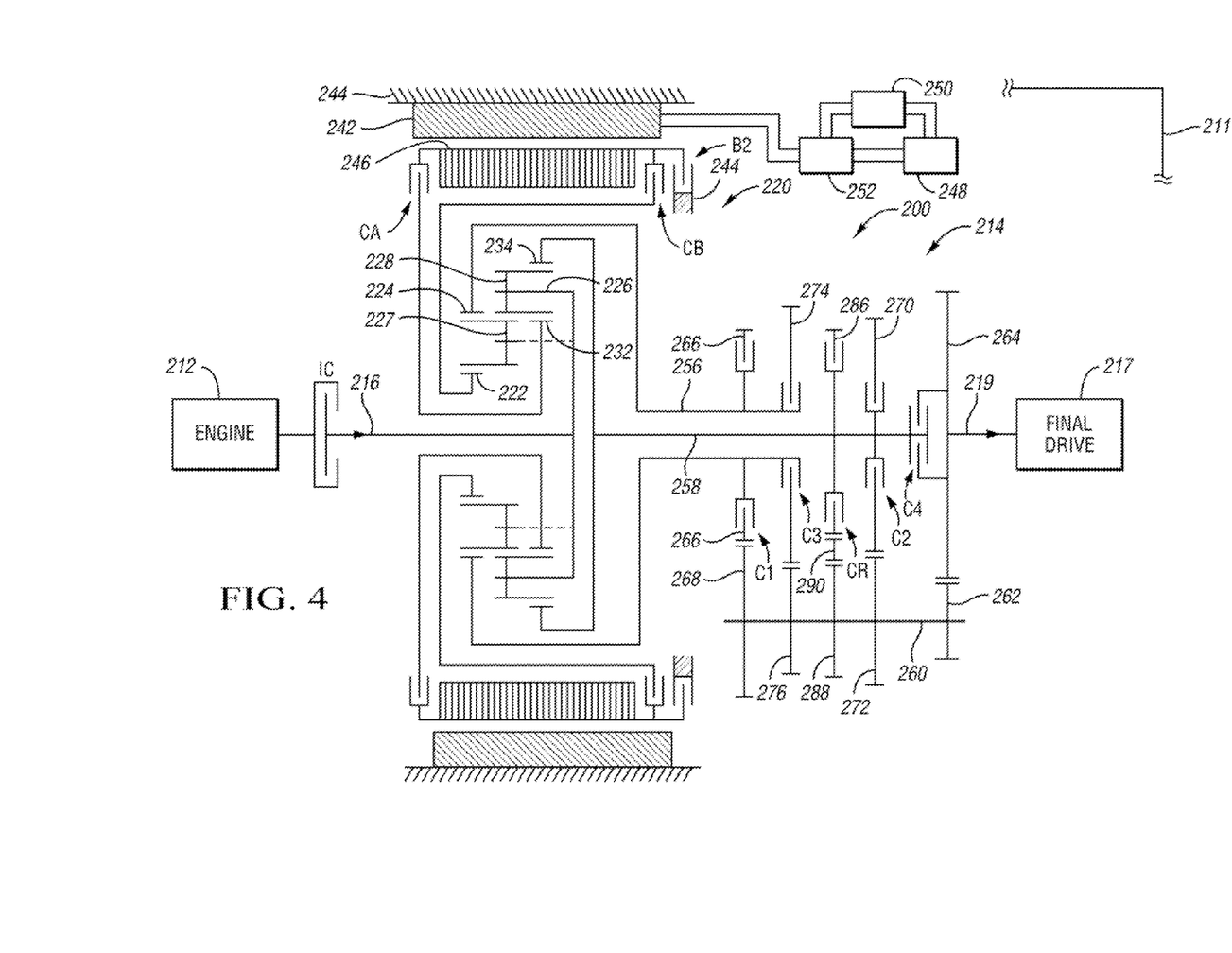
FIG. 4 is a schematic illustration of a third powertrain including a third transmission within the scope of the invention.

FIG. 4 shows a powertrain 200 for a vehicle 211 (shown schematically). The powertrain 200 includes an engine 212 connected to one embodiment of an electrically variable transmission (EVT) designated generally by the numeral 214. The transmission 214 is designed to receive at least a portion of its driving power from the engine 212. The engine 212 has an output shaft connected with an input member 216 of the transmission 214. A final drive unit 217 is operatively connected to an output member 219 of the transmission 214.

The transmission 214 includes a compound differential gear set 220 node lever diagram with the sun gear member 222, sun gear member 232, carrier member 226, and ring gear members 224 and 234 corresponding with the five nodes. The carrier member 226 rotatably supports a set of pinion gears 227 that intermesh with both the sun gear member 222 and the ring gear member 224. The carrier member 226 also rotatably supports a second set of pinion gears 228 that intermesh with the pinion gears 227 and the ring gear member 234.

The input member 216 is continuously connected with the carrier member 226. A single motor/generator 240 includes a stator portion 242 grounded to a stationary member 244, such as the transmission housing. The motor/generator 240 also includes a rotor portion 246 that is selectively connected to the sun gear member 232 via motor clutch CA. The rotor portion 246 is also selectively connected to the sun gear member 234 via motor clutch CB. The ring gear members 224 and 234 are two separate output gear elements of the differential gear set 220 partially forming two separate power paths through the transmission 214, as discussed below.

The stator 242 may receive electrical power from or provide electrical power to an energy storage device 248 such as a battery. An electronic controller 250 is in signal communication with the battery 248 and with a power inverter 252 that is also in electrical communication with the stator 242. The controller 250 regulates the flow of power between the motor/generator 240 and the battery 248 via the inverter 252 in the same manner as described above with respect to controller 50 of FIG. 1.

Ring gear member 224 is continuously connected with transfer shaft 256. Ring gear member 234 is continuously connected with transfer shaft 258. A countershaft 260 is continuously connected with the output member 219 via an output gear set gear that includes gear 262 rotating commonly with countershaft 260 and gear 264 intermeshing with gear 262 and rotating commonly with output member 219. A plurality of intermeshing gears selectively transfer torque from the transfer shafts 256, 258 to the countershaft 260. A first intermeshing gear set includes intermeshing gears 266 and 268. Gear 266 rotates concentrically about transfer shaft 256 and is selectively connectable for common rotation therewith by selective engagement of clutch C1. Gear 268 rotates with countershaft 260. A second intermeshing gear set includes intermeshing gears 270 and 272. Gear 270 rotates concentrically about transfer shaft 258 and is selectively connectable for common rotation therewith by selective engagement of clutch C2. Gear 272 rotates with countershaft 260. A third intermeshing gear set includes intermeshing gears 274 and 276. Gear 274 rotates concentrically about transfer shaft 256 and is selectively connectable for common rotation therewith by selective engagement of clutch C3. Gear 276 rotates with countershaft 260. A reverse gear set includes intermeshing gears 286, 288 and 290. Gear 286 rotates concentrically about transfer shaft 258 and is selectively connectable for common rotation therewith by selective engagement of clutch CR. Gear 288 rotates with countershaft 260. Reversing gear 290 intermeshes with both gears 286 and 288 so that gears 286 and 288 rotate in the same direction. The reversing gear 290 is supported on a separate shaft or separate structure (not shown) and rotates about an axis parallel to the transfer shafts 256, 258 and countershaft 260. Clutch C4 is selectively engagable to directly connect gear 264 and output member 219 for common rotation with countershaft 258.

In addition to the clutches C1, C2, C3, C4, CA, CB and CR, an input clutch IC is selectively engagable to connect the engine 212 to the input member 216. Finally, a motor brake B2 selectively grounds the rotor 246 to the stationary member 244. Accordingly, the transmission 214 has nine torque-transmitting mechanisms IC, CA, CB, B2, C1, C2, C3, C4 and CR. The torque-transmitting mechanisms are operatively connected to controller 250 which controls engagement thereof to provide a variety of operating modes.

The powertrain 200 provides several electric-only operating modes wherein power is provided only by the motor/generator 240, such as key-on engine starting, engine-off reverse driving, engine-off forward driving. Many electrically variable operating modes are provided, in which both the engine 212 and the motor/generator 240 provide power, including EVT reverse ranges, EVT forward ranges wherein the motor/generator is acting as a generator to charge the battery 248, or is acting as a motor to add mechanical power to the sun gear member 222 or to provide torque for braking. If braking occurs during these modes, the motor/generator 240 may be controlled to convert rotational speed one one of the sun gear members (i.e., mechanical power of sun gear member 222 or 232 depending on which of the clutches CA or CB is engaged), into stored electrical power in the battery 248 with the motor rotor 246 absorbing torque as it does so to help slow the vehicle 211 and slow the output member 219. Similarly, in certain EVT ranges, the motor/generator 240 is controlled to operate as a generator to recharge the battery 248. EVT forward ranges are achieved by engaging clutch IC, either CA or CB and any one of clutches C1, C2, C3 and C4. An EVT reverse range is achieved by engaging clutch IC, either CA or CB and clutch CR. Fixed ratios are achieved by engaging clutch IC, both CA and CB and any one of clutches C1, C2, C3, C4 and CR, or only one of CA and CB and two of the remaining forward gear ratio clutches, such as C1 and C2, C2 and C3, C3 and C4, similar to the engagement schedule indicated with respect to transmission 200 in FIG. 2. Alternatively, B2 may be engaged along with either CA or CB to brake the rotor 246 and one of the sun gear members 222 and 232, respectively, thus providing a fixed ratio through the differential gear set 220, and a fixed ratio through the transmission 200 when combined with one of the forward or reverse gear ratio clutches (C1, C2, C3, C4 or CR).

As electrically variable reverse operating mode is achieved by engaging the clutch IC, clutch CB and the clutch CR. When the motor/generator 240 is operated as either a motor or as a generator and the engine 212 is on, torque will be delivered from the ring gear member 224 along transfer shaft 258 through reverse gear set (gear 286, gear 290 and gear 288), to countershaft 260 and then through gears 262 and 264 to output member 219. Because of the reversing gear 290, the transfer shaft 258 and countershaft 260 rotate in the forward direction so that output member 219 rotates in the reverse direction.

An electric-only operating mode is provided by engaging clutches CA and CB and clutch C1 so that the motor/generator 240 provides power through the differential gear set 220 to the transfer shaft 256 and through gears 266 and 268 via engaged clutch C1 through gears 262 and 264 to output member 219. In this mode, the differential gear set 220 is locked for common rotation. By engaging the input clutch IC, the engine may be started if, for example, additional torque is required for acceleration.

A first power path including ring gear member 224 and transfer shaft 256 is used when any of clutches C1 and C3 are engaged. A second power path including ring gear member 234 and transfer shaft 258 is used whenever any of clutches C2, C4 and CR are engaged.

While the best modes for carrying out the invention have been described in detail, those familiar with the art to which this invention relates will recognize various alternative designs and embodiments for practicing the invention within the scope of the appended claims.

The invention claimed is:

1. A transmission for a vehicle with an engine comprising:
an input member for receiving power from the engine;
an output member;
a motor/generator;
a differential gear set having a first, a second, a third and a fourth gear element operatively interconnected with one another; wherein said input member and said motor/generator provide power to said output member via said first and second gear elements respectively;
a plurality of intermeshing gears including a reversing gear and gears connected for rotation with said output member;
a plurality of selectively engagable torque-transmitting mechanisms;
first and second concentric transfer shafts connected to said third and fourth gear elements, respectively, for common rotation at the same speed therewith, and each operatively connectable with said output member via different ones of said intermeshing gears by engagement of different selected ones of said torque-transmitting mechanisms, thereby forming selectable first and second power paths, respectively, between said third and fourth gear elements, respectively, and said output member; and
wherein the transmission provides multiple operating modes including an electrically variable reverse operating mode utilizing said reversing gear.

2. The transmission of claim 1, wherein two of said torque-transmitting mechanisms separately selectively connect said motor/generator with two of said gear elements, respectively.

3. The transmission of claim 1, wherein said motor/generator is continuously connected with one of said elements of said differential gear set.

4. The transmission of claim 1, wherein said torque-transmitting mechanisms include a brake selectively engagable for grounding said motor/generator to a stationary member.

5. The transmission of claim 1, wherein said differential gear set is a compound planetary gear set that further includes a fifth gear element, and wherein said five gear elements are a planet carrier member, a first sun gear member, a second sun gear member, a first ring gear member and a second ring gear member; wherein the planet carrier member is equipped with a first set of planet pinion gears which mesh with said first sun gear member and said first ring gear member and a second set of planet pinion gears which mesh with said second sun gear member and said second ring gear member; and wherein said first set of planet pinion gears meshes with the second set of planet pinion gears.

6. The transmission of claim 5, further comprising:
a countershaft operatively connected with said output member;
wherein said transfer shafts are operatively connectable with said output member via said countershaft; wherein said motor/generator is separately selectively connectable to said first sun gear member and said second sun gear member via different ones of said torque-transmitting mechanisms; wherein said input member is connected for common rotation with said carrier member;

and wherein said output member is alternately selectively operatively connectable to said first ring gear member and said second ring gear member along said first and said second power paths, respectively.

7. The transmission of claim 1, wherein one of said torque-transmitting mechanisms is a clutch selectively engagable to connect the engine with said input member.

8. The transmission of claim 1, wherein one of said torque-transmitting mechanisms is a lock-up clutch that selectively connects two of said gear elements for common rotation.

9. The transmission of claim 1, wherein said motor/generator is characterized by an absence of any other motor/generators usable for propulsion.

10. The transmission of claim 1, wherein said differential gear set has a fifth gear element, wherein one of said torque-transmitting mechanisms is a first motor clutch selectively connecting said motor/generator with said second gear element; wherein another of said torque-transmitting mechanisms is a second motor clutch selectively connecting said motor/generator with said fifth gear element; wherein said first and second motor clutches are disengaged during shifting between at least some of said operating modes to disconnect inertia of said motor/generator, thereby enabling manual shifting of said torque-transmitting mechanisms.

11. The transmission of claim 1, wherein said differential gear set has a fifth gear element, wherein one of said torque-transmitting mechanisms is a first motor clutch selectively connecting said motor/generator with said second gear element;
wherein another of said torque-transmitting mechanisms is a second motor clutch selectively connecting said motor/generator with said fifth gear element; and wherein a third of said torque-transmitting mechanisms is an input clutch selectively connecting the engine and said input member.

12. The transmission of claim 11, wherein one of said first and second motor clutches is engaged while said input clutch is engaged, power from the engine and from said motor/generator thereby being combined in a hybrid parallel operating mode through said differential gear set and said transfer shafts.

13. The transmission of claim 11, wherein said operating modes include an electric-only drive mode characterized by engagement of one of said first and second motor clutches and disengagement of said third torque-transmitting mechanism; and wherein said one of said first and second motor clutches remains engaged and said third torque-transmitting mechanism is engaged to restart the engine following said electric-only drive mode.

14. The transmission of claim 11, wherein one of said torque-transmitting mechanisms is a brake selectively dynamically engagable to partially ground one of said second and said fifth gear elements to a stationary member, wherein engagement of a different one of said torque-transmitting mechanisms selectively engagable with one of said transfer shafts and disengagement of another of said torque-transmitting mechanisms selectively engagable with the other of said transfer shafts both occur during slipping of said brake to shift from a first hybrid parallel operating mode to a second hybrid parallel operating mode.

15. The transmission of claim 11, wherein said operating modes include a regenerative braking mode characterized by engagement of one of said first and said second motor clutches and by disengagement of said third torque-transmitting mechanism to prevent power flow between the engine and said input member, with said motor/generator controlled to function as a generator to convert mechanical energy into electrical energy during said regenerative braking mode.

16. The transmission of claim 1, wherein at least three of said multiple operating modes are characterized by electrically variable speed ratio operation from said input member to said output member.

17. A transmission for a vehicle with an engine comprising:
an input member for receiving power from the engine;
an output member;
a motor/generator;
a compound differential gear set having four gear elements operatively interconnected with one another; wherein said input member is operatively connectable with a first of said gear elements, said motor/generator is operatively connectable with a second of said gear elements;
first and second transfer members continuously connected with said third and fourth gear elements respectively to partially form first and second power paths, respectively, between said differential gear set and said output member;
a plurality of intermeshing gears including a first gear set operatively connectable using a selectively engagable torque-transmitting mechanism to provide a speed ratio for forward rotation between said first transfer member and said output member, and a second gear set operatively connectable using another selectively engagable torque-transmitting mechanism to provide a speed ratio for reverse rotation between said second transfer member and said output member; and
wherein said speed ratio for forward rotation and said speed ratio for reverse rotation are such that when said torque-transmitting mechanisms are both engaged, said input member is stationary while rotation and speed of said output member are determined by rotation and speed of said motor/generator.

18. The transmission of claim 17, wherein the transmission is characterized by the absence of any other motor/generator used for propulsion.

19. A method of operating a transmission having first and second power paths at least partially defined by first and second transfer shafts, each of said transfer shafts being operatively connectable to a countershaft via different sets of intermeshing gears establishing different gear ratios, wherein the transfer shafts and a transmission input member are each connected to different members of a differential gear set, the method comprising:
slipping a first torque-transmitting mechanism connected to another member of the differential gear set to thereby alter a speed of rotation of the first transfer shaft;
during said slipping, engaging a second torque-transmitting mechanism to connect a first gear for common rotation with the first transfer shaft to thereby transfer torque via said first power path through one of said sets of intermeshing gears; and
during said slipping and after said engaging, disengaging a third torque-transmitting mechanism to disconnect a gear from common rotation with said second transfer shaft to thereby transfer torque via said second power path through another of said sets of intermeshing gears.

* * * * *